United States Patent
Shewchenko et al.

(10) Patent No.: US 7,844,892 B2
(45) Date of Patent: Nov. 30, 2010

(54) METHOD AND SYSTEM FOR DISPLAY OF BUSINESS INTELLIGENCE DATA

(75) Inventors: Nadia Shewchenko, Ottawa (CA); Henning Hoffmann, Ottawa (CA); Roger Chang, Ottawa (CA); Lesley Grignon, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 1119 days.

(21) Appl. No.: 11/465,315

(22) Filed: Aug. 17, 2006

(65) Prior Publication Data
US 2008/0046805 A1 Feb. 21, 2008

(51) Int. Cl.
*G06F 17/00* (2006.01)
(52) U.S. Cl. .................... 715/215; 715/212
(58) Field of Classification Search .............. 715/212, 715/215, 255; 705/35
See application file for complete search history.

(56) References Cited

U.S. PATENT DOCUMENTS

| | | | |
|---|---|---|---|
| 6,529,217 B1* | 3/2003 | Maguire et al. | 715/769 |
| 6,993,712 B2* | 1/2006 | Ramachandran et al. | 715/234 |
| 7,281,218 B1* | 10/2007 | Runge et al. | 715/769 |
| 7,420,562 B2* | 9/2008 | Shinohara et al. | 345/440 |
| 2002/0118192 A1* | 8/2002 | Couckuyt et al. | 345/440 |
| 2007/0094108 A1* | 4/2007 | Nault | 705/30 |
| 2008/0282139 A1* | 11/2008 | Davis | 715/205 |
| 2009/0144242 A1* | 6/2009 | Modzelewski | 707/3 |

* cited by examiner

*Primary Examiner*—Thu Huynh
(74) *Attorney, Agent, or Firm*—Patterson & Sheridan, LLP

(57) ABSTRACT

The invention provides improved mechanisms for the construction and rendering of graphical results sets for business intelligence reports derived from large volumes of data. This is achieved by various means including, determining the amount of useful data that can be rendered within the available display space while still being legible, determining the most effective way of displaying that data within the display space, and providing for limited control of the format and quantity of data displayed.

19 Claims, 8 Drawing Sheets

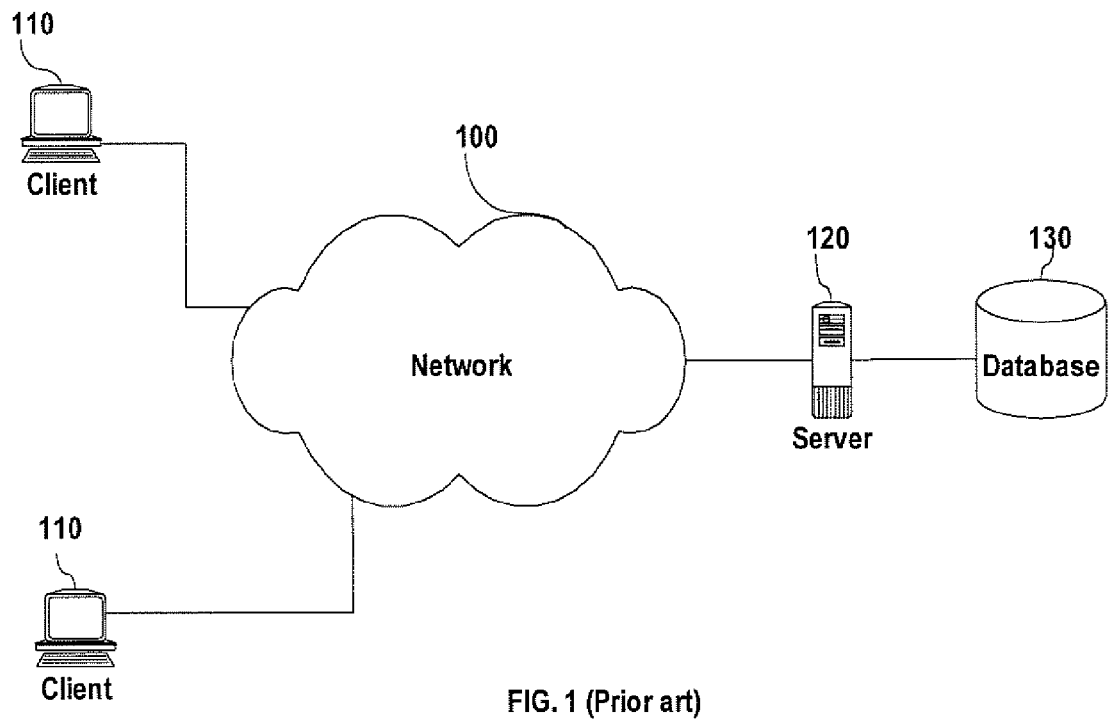
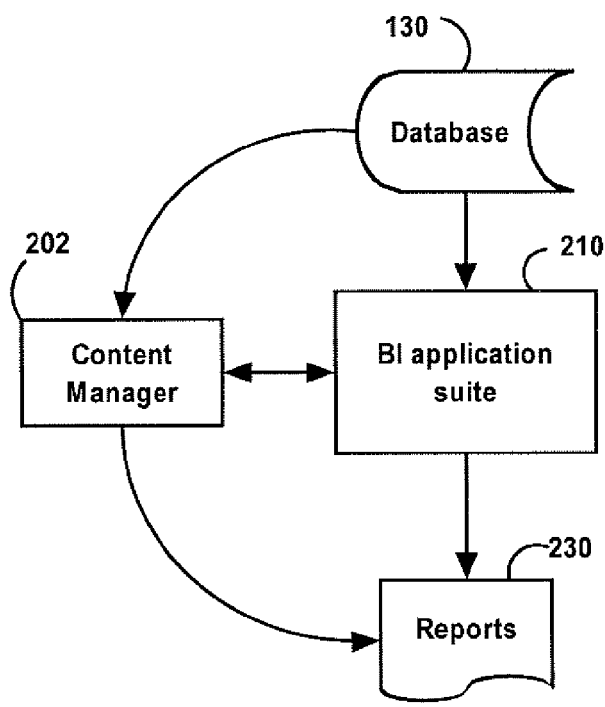
FIG. 1 (Prior art)
FIG. 2 (Prior art)

METHOD AND SYSTEM FOR DISPLAY OF BUSINESS INTELLIGENCE DATA

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A SEQUENCE LISTING

Not Applicable

FIELD OF INVENTION

This invention relates to business intelligence. More specifically, this invention relates to the construction and rendering of graphical results sets for business intelligence reports.

BACKGROUND OF THE INVENTION

In complex business intelligence systems, it is common to produce charts to assist in interpreting data.

Web-based enterprise reporting solutions can be designed to address a full range of reports, including production reports such as invoices and statements, statutory reports, and business and analytical reports. Currently companies often use different reporting tools for different applications. However, in rendering result sets, the user is all too often presented with a chart that contains illegible information, such as having columns that are so narrow that their colour is not distinguishable, or having so many lines that it is impractical to follow a particular series. For instance, if a chart has 1000 categories and 1000 legend entries, rendering all this data in one chart would produce a chart that is almost impossible to read.

Previous attempts to improve the situation have required the user to make a number of choices and selections—participating in the design of the graphical form of the results. The results have not always been satisfactory. The 80-20 suppression algorithm used in various business intelligence products is an example of such attempts. To illustrate this algorithm and its limitations, consider a column chart that would ordinarily show 1000 columns. With 80-20 suppression, the tallest columns whose values comprise 80% of the total are shown and the remaining 20% are amalgamated into one column and shown as "Other". For example, the top 11 categories that comprise 81% of the total are shown in 11 distinct columns, and the 989 categories that comprise the remaining 19% are shown as the "Other" column. Selecting this "Other" column and exploring its details (i.e. "drilling down") causes the existing chart to be replaced with another column chart. In this detailed column chart, the 80-20 suppression rule also applies such that the largest of the remaining 989 categories are shown and the remainder amalgamated into a further "Other" column.

This algorithm works well until a large number of the categories to be shown in the chart are the same or similar size. In such cases, it may take hundreds of categories to comprise 80% of the chart, all of which will be shown in a column chart as many distinct, very thin columns; in fact, the largest column in such a chart might well be the "Other" column.

There are many forms of graphical display possible, and each has its use. The selection of the most effective vehicle to illustrate particular business information or a trend is also of interest.

Earlier attempts at solving this problem have included adopting strategies such as:
  Rendering the data in the form of a large chart that is directly navigated by panning and zooming.
  Rendering several charts based upon one or more control breaks as exemplified in FIG. 7.
  Shrinking the image to fit within rendering region.
These all have one or more disadvantages or shortcomings.

BRIEF SUMMARY OF THE INVENTION

The invention provides for a method and system that alleviates many of the disadvantages of earlier methods and systems. Embodiments of the invention seek to improve on solutions previously used, and to provide a user-friendly means to do so. They achieve this by:
  Determining the amount of useful data that can be rendered within the available display space while still being legible.
  Determining an effective way of displaying that data within the display space.
  Optionally, allowing the user to have input to select the format and quantity of data displayed.

Thus, when asked to create a chart with large amounts of data, applications making use of the invention render the data such that the user can view the data with ease.

In particular, the data to be displayed is divided to be shown in multiple, potentially overlapping, sub-charts. Optimal understanding and clarity of the data displayed may be achieved by:
  Keeping font sizes, symbol sizes, line sizes, and data spacing within certain understood and pre-definable limits of legibility;
  Informing the user of the limitations of the displayed data imposed by the restricted size, when compared to the totality of data in the report;
  Providing 'edge tools' that permit a degree of continuity between pages and limit the potential confusion of users, or
  Adjusting the parameters of the 'edge tools'.

In accordance with one aspect of the present invention, there is provided a method for graphical display of selected data from a data source for use in a business intelligence reporting system, comprising determining interactively with a user a generalized design of a report for subsequent displaying of the selected data in sub-charts, selecting series, categories and measures of interest for inclusion in a report, and storing the series, the categories and the measures of interest in a collection of display rules, extracting a first set of data pertaining to the series, the categories and the measures of interest from the data source, storing the first set of data in a crosstab, selecting a subset of the first set of data in the crosstab, sending the selected subset of the first set of data to a charting engine, creating a virtual chart containing the selected subset of the data, determining a sub-chart of the virtual chart according to the stored collection of display rules, and rendering the sub-chart of the virtual chart by a graphics engine using the stored collection of display rules.

BRIEF DESCRIPTION OF THE SEVERAL VIEWS OF THE DRAWINGS

The invention and the illustrated embodiments may be better understood, and the numerous objects, advantages, and features of the present invention and illustrated embodiments will become apparent to those skilled in the art by reference to the accompanying drawings. In the drawings, like reference numerals refer to like parts throughout the various views of the non-limiting and non-exhaustive embodiments of the present invention, and wherein:

FIG. 1 shows a network environment suitable for business intelligence systems that make use of the invention;

FIG. 2 shows a simplified version of a BI system in which embodiments of the invention may be practiced;

DETAILED DESCRIPTION OF EMBODIMENTS OF THE INVENTION

Figure 3:
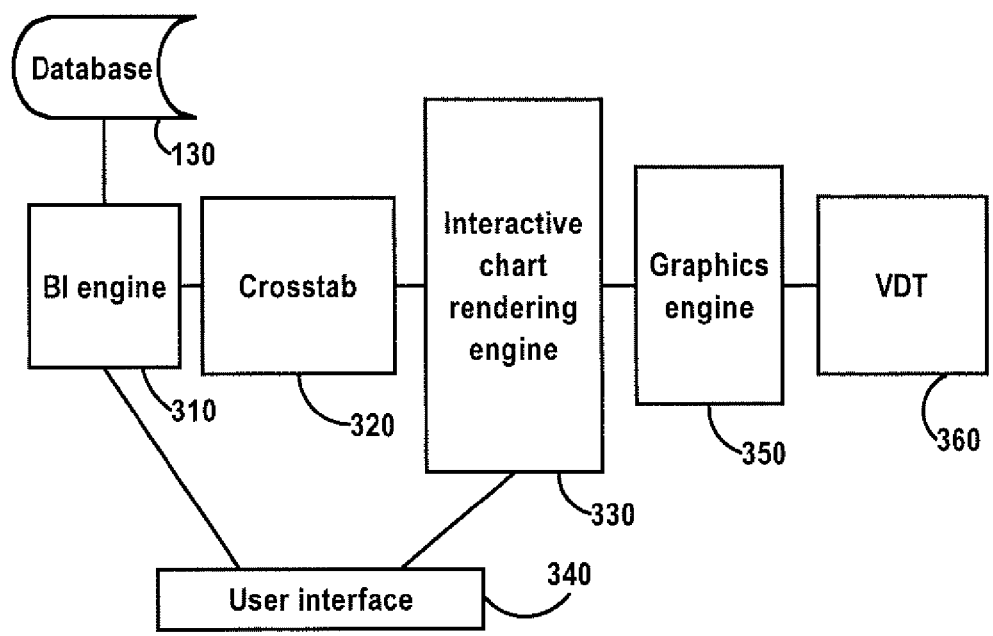
FIG. 3 shows further details of an environment within which to practice embodiments of the invention.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

The terms "categories" and "series" are intended to include collections of qualitative values describing one or more properties of the quantitative values to be plotted. The qualitative values may be nested. Such qualitative values may include, but are not limited to, the time period, location, product, sales channel, and scenario. One distinction between categories and series may be the charting axes upon which they appear.

"Control breaks" are intended to be used to divide data up, depending on predefined rules that take into account the nature of the data and the display requirements of the user.

The term "crosstab" is intended to include the data-mining feature that allows the summarization and analysis of large amounts of data in lists and tables. In the broadest sense, a crosstab is a chart with two axes that shows actual data values rather than plotted points, lines, bars, etc. Generally a crosstab is derived from an underlying database or warehouse using data extraction tools.

The term "display rules" is intended to refer to those rules used by a display engine to ensure the legibility of data in a chart; this is achieved, for example, by setting limits on number of series shown in a given chart. These limits depend on factors chosen by a report author, although in some embodiments the user is permitted to override such factors.

The term "edge tool" is intended to include controls and data displayed to inform the user of the existence of data beyond the data currently visible. Examples of such controls may include scrolling and panning soft keys, and examples of such data may include overall totals and sub-totals.

The term "legibility" is intended to describe the capability to identify any individual plot or series and distinguish it from all other plots or series. In cases where a chart is interactive, legibility may be further defined to be the capability to identify and interact with any individual plot or series.

The term "measures" is intended to include quantitative values extracted from data in a database, fact table or cube, or derived by calculation from those sources. Non-limiting examples of measures included sales counts, sales prices, costs, sub-totals or totals.

The term "page" is intended to include the area on a visual display terminal occupied by the visible part of a virtual chart or table.

The expression "paging" (verb "to page") is intended to include both vertical and horizontal panning and scrolling movement of the page over the virtual chart or table.

The term "plot" is intended to include a specific data point, line, bar, column, slice, or other graphical elements on a chart.

The term "render" is intended to include the process of producing a displayed representation of the data, and ancillary information including legends, scrolling controls, and retention controls.

The terms "retention state" and "retention control" are intended to include a Boolean state of a category or series that determines whether the associated plots and/or values are repeated on subsequent sub-charts. In effect, one or more columns may be "fixed"; that is they may be marked so that they will be shown on all of the sub-charts as the user scrolls or pages through data in a report. Such columns or series are also referred to as "sticky". The visible manifestation of a retention state is an associated retention control that shows the current retention state. This control may allow the user to change or override the retention state.

The terms "scrolling" and "panning" are intended to include action of shifting data on a chart. Panning is the shifting of data in one direction, for example, horizontal. The scrolling direction is usually perpendicular to the panning direction. When reference is made to either of these terms, either or both actions may be involved.

The term "sub-chart" is intended to refer to the visible area of a virtual chart—sometimes referred to as a "page".

The term "usability" is intended to describe the capability to compare any individual plotted value with any other plotted value. If the two values are plotted and rendered far enough apart that they cannot be seen on the screen at the same time, or in the case of hard copy versions, are on different sheets of paper that they cannot be compared easily, this limits the usability and hence the usefulness of the chart.

The terms "virtual chart" and "virtual table" are intended to include the notional overall, and likely graphical, result of a reporting operation. A virtual chart is generally too large to be rendered as a single page or screen, and therefore is the subject of embodiments of this invention that divide it into sub-charts.

The terms "widow control" and "orphan control" are intended to include steps used to ensure that fragments of a virtual chart at the head and foot of a page are retained in each sub-chart. Examples of these fragments include items such as the title, any relevant notes relating to the data, overall totals, sub-totals, and legends.

The term windowing is intended to include the breaking up of displayed data when the total amount of data to be displayed exceeds reasonable thresholds of legibility and usability.

EMBODIMENTS OF THE INVENTION

We turn first to FIG. 1 showing a network environment in which embodiments of the invention may be practiced. A number of independently operated clients 110 interact with a server 120 over a network 100. These clients 110 are usually general-purpose computers, and their actual function may vary; for example, each may represent a user-controlled terminal having software installed that allows thin client operation. In some embodiments this thin client is a web browser and associated applets. The server 120 is also a general-purpose computer having installed in it software to carry out business intelligence functions and ancillary operations, including content management. The server 120 is connected to one or more databases, or data warehouses 130. These databases 130 contain business data that can be used to produce reports required by users. These reports may be displayed on screens of the client computers 110, or may be reproduced as a hard copy using printers (not shown) associated with either the clients 110 or the server 120.

FIG. 2 shows in outline form the major elements of a business intelligence system suitable for incorporating embodiments of the present invention. The business intelligence (BI) application suite 210 includes a content manager 220 to store and serve report definitions from which to construct reports 230. The content manager 220 stores and serves definitions of one or more business database sources 130, among other environment data, required by the reporting subsystem (part of the B application suite 210). In business intelligence systems, the one or more business databases 130 are typically arranged to be read-only, since they contain historical information from which business trends and other analyses are to be produced. The BI application suite 210 carries out many different functions, including facilitating the development of report formats and the format conversion of different data sources. These functions permit large businesses to maintain a uniform reporting process, even where the original data have different formats and content. The content management function, or content manager 220, has been shown and described separately from the rest of the business intelligence application suite 210 to emphasize its role in embodiments of the invention; normally it is considered an integral part of that suite.

FIG. 3 depicts in more detail a system capable of using embodiments of the invention. Here the database 130, which contains historical data in the form of business transactions, is accessed by a business intelligence engine 310, part of the business intelligence application suite (see FIG. 2 210), on command of the user interface 340 to produce a crosstab 320. This crosstab contains the information that is desirable to be explored in more detail for the purpose of obtaining more insight into specific transactions of the business. An interactive chart rendering engine 330 then provides suitable views of the data contained in the crosstab. These views of the data may result from the use of generalized reports, or report templates, produced in advance. The resulting charts are passed to a graphics engine 350 for conversion into an appropriate graphical representation on a visual display terminal (VDT) 360. The user can make changes interactively via the user interface 340 to the display, either by the selection of a different crosstab 320 of data, or by adapting or reformatting the information displayed from the crosstab 320 on the VDT 360, thereby producing instances of a report. Embodiments of the invention are therefore implemented within the interactive chart-rendering engine 330, although aspects of embodiments affect other elements, particularly the user interface 340 and the graphics engine 350.

Generally, legibility of a chart is defined to be the capability to identify any individual plot and distinguish it from all other plots. In cases where a chart is interactive, legibility is further defined to be the capability to identify, and interact with, any individual plot (or series).

Both legibility and usability of a chart need to be considered. The 'fixed columns' aspect (and associated retention states) of the present invention resolves this and other issues.

When a user asks for a chart to be rendered with a given set of data, it is preferred that this chart to be rendered automatically so that the data are both legible and usable on the screen and, if applicable, in hardcopy. This is especially important where the amount of data requires multiple screens or pages to be used. The selection of the criteria used to ensure legibility and usability is often that of the report author, although a user may override certain parameters.

Exemplary embodiments of the invention are described by reference to the following examples.

Figure 4:
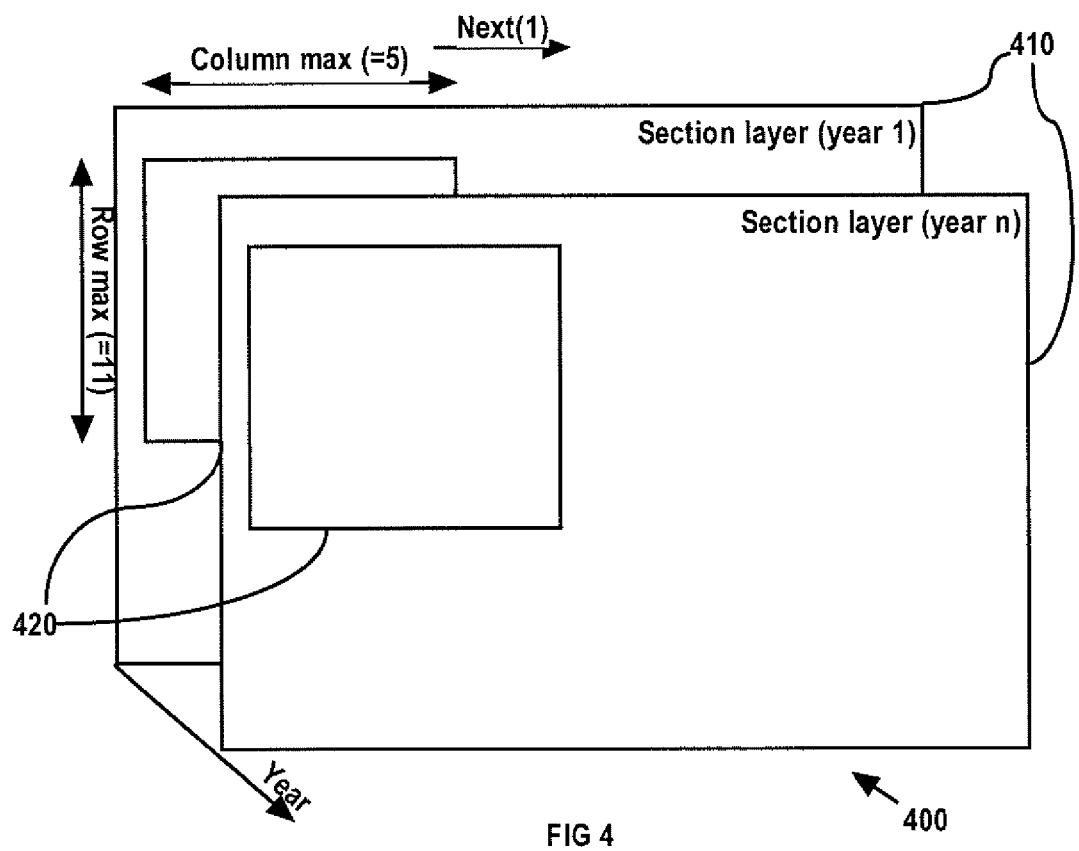
FIG. 4 depicts the data as transferred to a crosstab.

As described earlier, in preferred embodiments of the invention the data used in reports are selected from a larger set of business intelligence data stored in one or more databases or data warehouses 130. This set of data is determined to some degree by the reporting process, usually defined by a report author in consultation with a user. A user then further determines at least some aspects of which data are chosen to be included, such as the timeframe or geographical area of interest. The selected data are placed in a crosstab 320. A reporting mechanism is then used to produce a virtual chart containing all of the data selected by a user to be displayed from data contained in the previously defined crosstab 320. FIG. 4 depicts such a virtual chart 400. The data from the database may be considered to be stored in section layers 410 of a large virtual chart 400. For example, each of these section layers 410 might pertain to a sales period of one year. Although only two such section layers are shown, embodiments of the invention may support a much larger number. (In real displays, these layers might be distinguished by colours, or multiple columns might be used.) As discussed earlier, for many large and complex business intelligence systems, such virtual charts will be too large to be displayed legibly in their entirety on currently available display devices. Embodiments of the invention therefore provide a method and system for the reformatting and reproducing of the data in the form of sub-charts, each containing a subset of the data that is part of a virtual chart, thereby providing a sophisticated form of windowing over the virtual chart. A sub-chart is depicted in FIG. 4 as a series of subsets 420 of the section layers 410. Each of these sub-charts has a maximum number of allowed categories (i.e. items that show up along the x-axis as columns) and a maximum number of allowed series (i.e. items displayed in the legend). Each of these maxima is configurable, usually with some guidance provided by the report author (e.g. in the form of a template). In some embodiments a default is set by the system during the authoring of the report. Further, each sub-chart may include elements such as sub-totals and overall totals derived from the virtual chart. These are displayed to provide an overview of the business, using measures of interest such as sub-totals or overall totals to compare with the displayed data.

Figure 5:
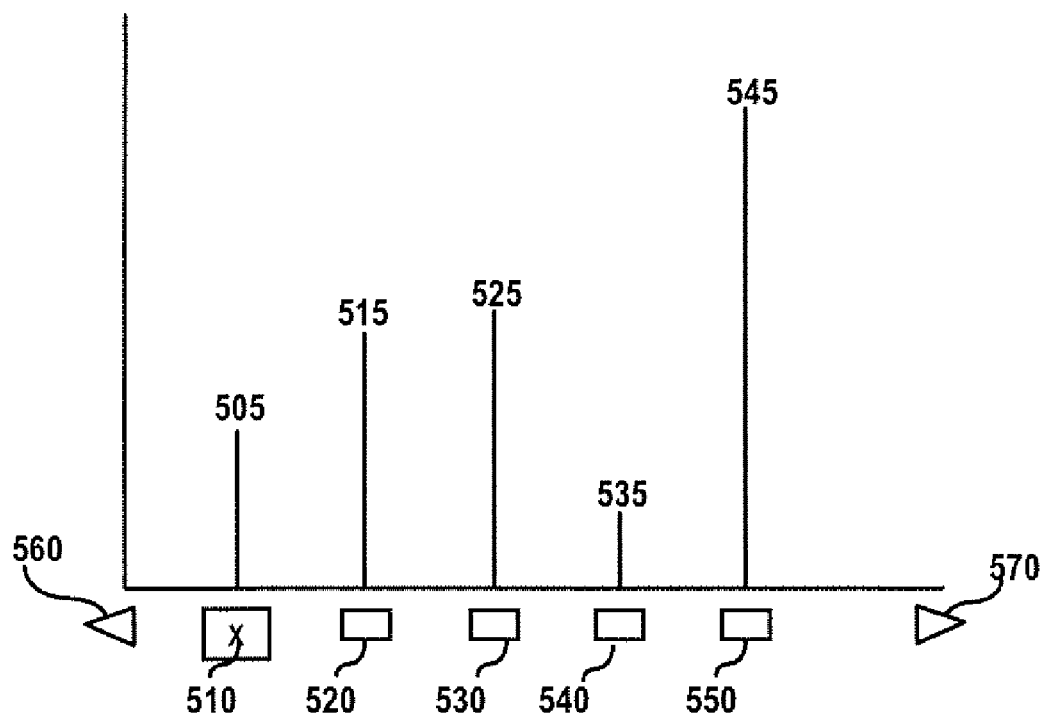
FIG. 5 shows a multicolumn chart having a number of categories.

FIG. 5 depicts a simple column chart resulting from the use of a system or method containing an embodiment of the invention. The figure shows five columns (categories) 505, 515, 525, 535, and 545, each with an associated retention state selection box (or retention control) 510, 520, 530, 540, 550. Each retention state selection box can display several states: for example, 'fixed and capable of user change', 'not fixed and capable of user change', 'fixed and not capable of user change'. In this example the retention state of the first column 505 is shown as being 'fixed and capable of user change' 510 so that when the user chooses to scroll the data, using either of the scroll soft keys 560 and 570, the first column 505 remains fixed in its position on the visible sub-chart. By this means, the user can compare the data in the first column with new data made visible by subsequent scrolling actions.

Although the examples relate to a relatively simple column chart of the type depicted in FIG. 5, the same principles are followed in defining the design and behaviour of other known chart types, including, but not limited to, pie charts and line charts.

Figure 6:
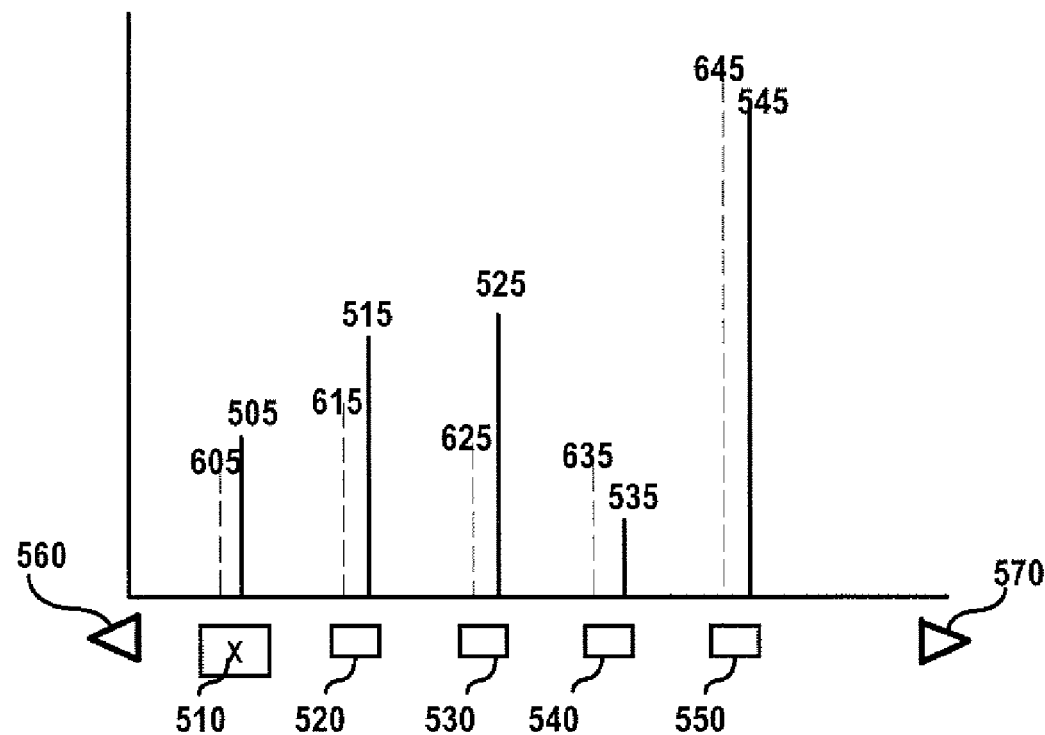
FIG. 6 shows a multicolumn chart having both categories and a number of series.

FIG. 6 shows a more complex column chart, similar to that depicted in FIG. 5, having a first series of 5 categories 505, 515, 525, 535, and 545 but with an additional set of columns 615, 615, 625, 635, and 645 corresponding to a second series of 5 categories. Note that in this case the retention state selection boxes 510, 520, 530, 540, 550 are associated with both of the series within each category. Other embodiments allow the user to scroll through the series shown in a given sub-chart and in this case each of the series has a retention state attribute and associated control (or selection box) incorporated in the legend for the chart, together with related scroll controls.

Figure 7:
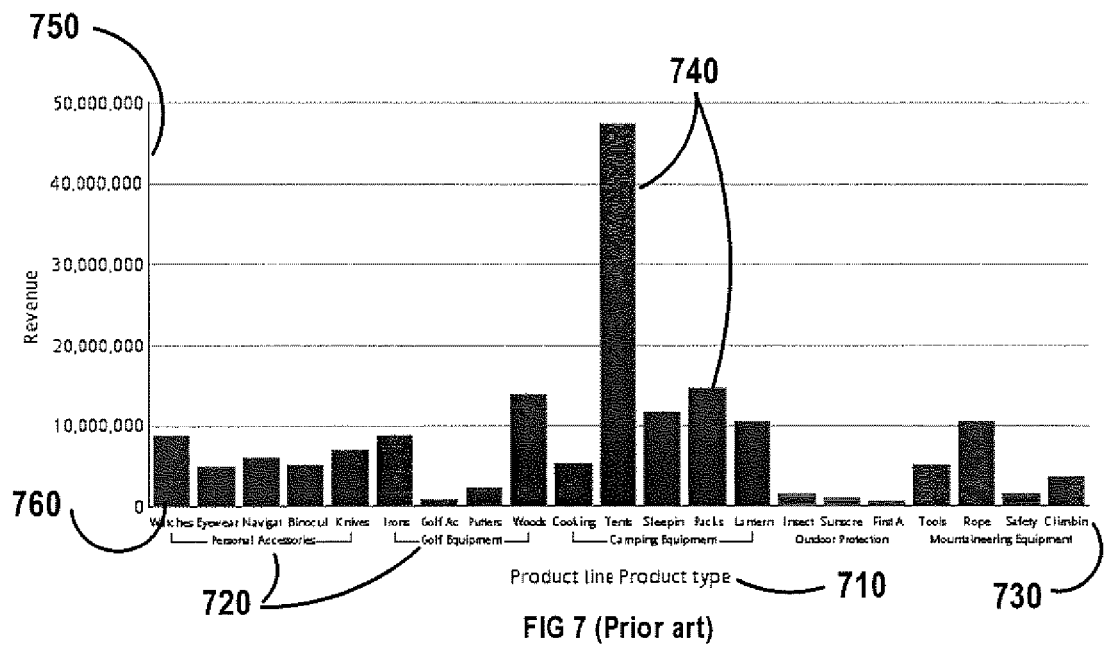
FIG. 7 shows a prior art column chart depicting several product lines grouped by product type.
Figure 8:
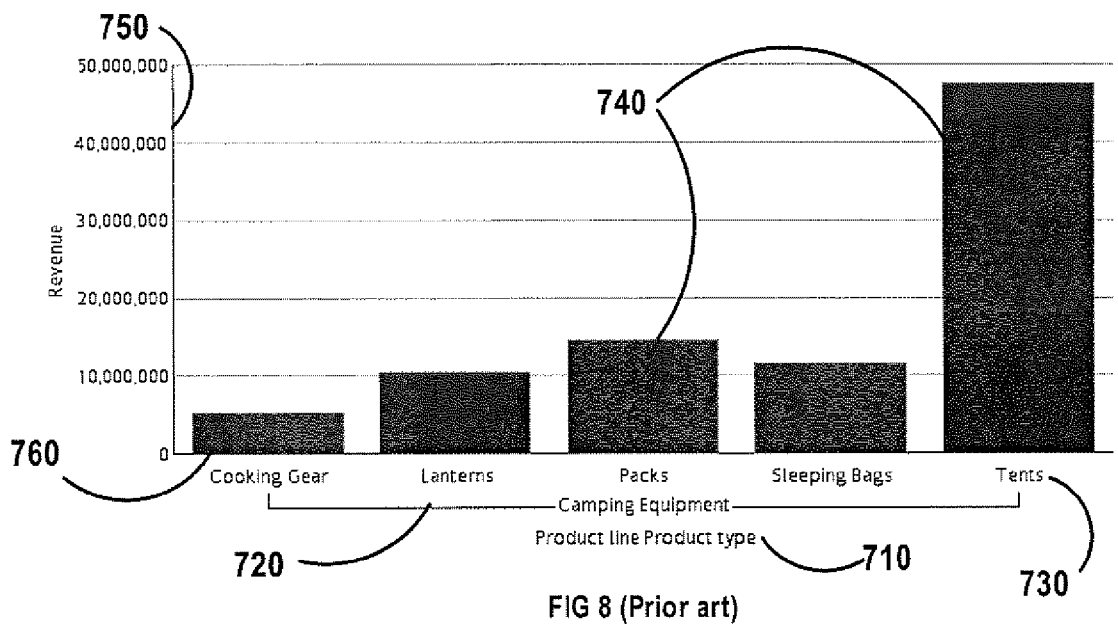
FIG. 8 shows a prior art column chart depicting several product lines selected by product type.

Screen shots from prior art implementations are shown in FIGS. 7 and 8. In FIGS. 7 and 8 are shown a y-axis 750, and an x-axis 760. Disposed on the x-axis of FIG. 7 are a number of categories 730 grouped as makes sense for the business 720 with a label 710. In the FIG. 8, one of the groups 720 has been selected for more detailed inspection and is shown alone on the x-axis 760 as a sub-chart. As can be seen, this selection results in the removal from the display of all other columns related to the business. In both of these the lack of controls (or selection boxes) to permit the retention of particular series on the display clearly limits the usability of the charts; this is especially noticeable when the user wishes to compare series shown on different sub-charts.

Figure 9:
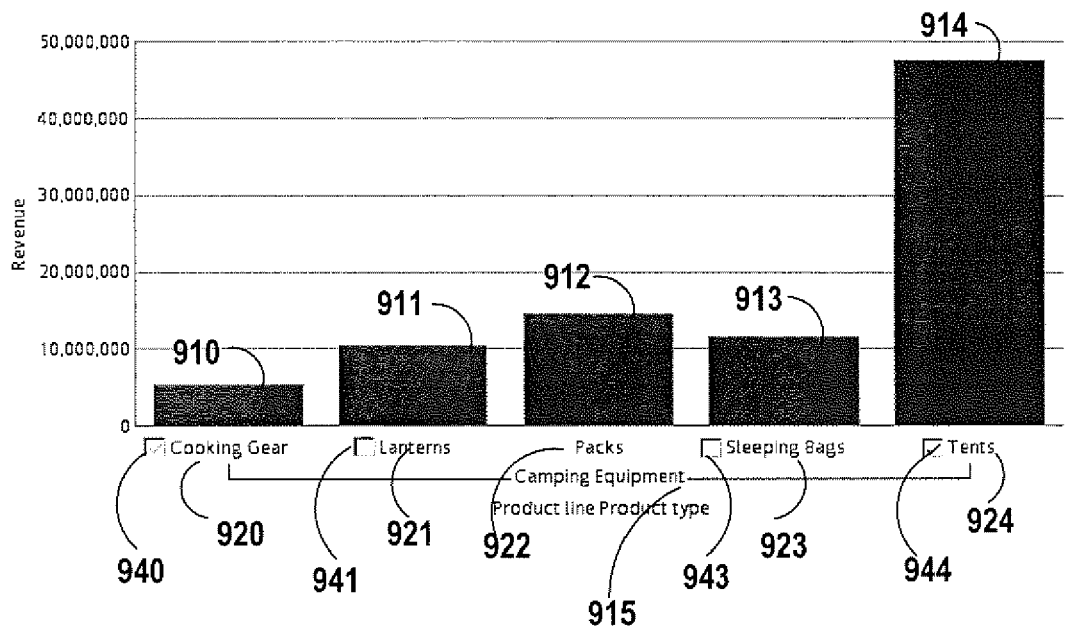
FIG. 9 shows an example of a column chart according to an embodiment of the invention, with the addition of controls for retention states attributes for each column.

For comparison, screenshots from a system incorporating embodiments of the present invention are now described. In the screen shot of FIG. 9 a number of columns 910, 911, 912, 913, 914 indicate the revenues for each of the product types having labels 920, 921, 922, 923, 924 respectively in a single product line 915. Some product types have associated tri-state check boxes 940, 941, 943, 944 to control their column retention state behaviours. Here, the left-most check box 940 is both checked and dimmed, indicating that report author has pre-defined this as a fixed column (checked), and also prevented the user from changing this setting (dimmed). The user can check/uncheck the retention states box 941, 943, 944 to make the associated column fixed or not as desired. Here, the right-most check box 944 is checked, indicating that user (or the report author) has chosen to make this column fixed.

The fact that check box 944 it is not dimmed means that the user is permitted to change this setting.

Note that the centre column 912, product type label 922 does not have a retention state check box. In this case this column's retention state behavior has been pre-defined as not fixed and the user is unable to override this setting—in other words, this column is always allowed to scroll out of view.

Other retention state check boxes 941 and 943 associated with the product types 921 and 923 are unchecked, indicating that they are not fixed and thus will not be shown on the next sub-chart when scrolling is performed. Moving to display a different sub-chart will not remove those columns having their retention states fixed—in this case 910 and 914—thereby allowing easy comparison with relevant data.

Figure 10:
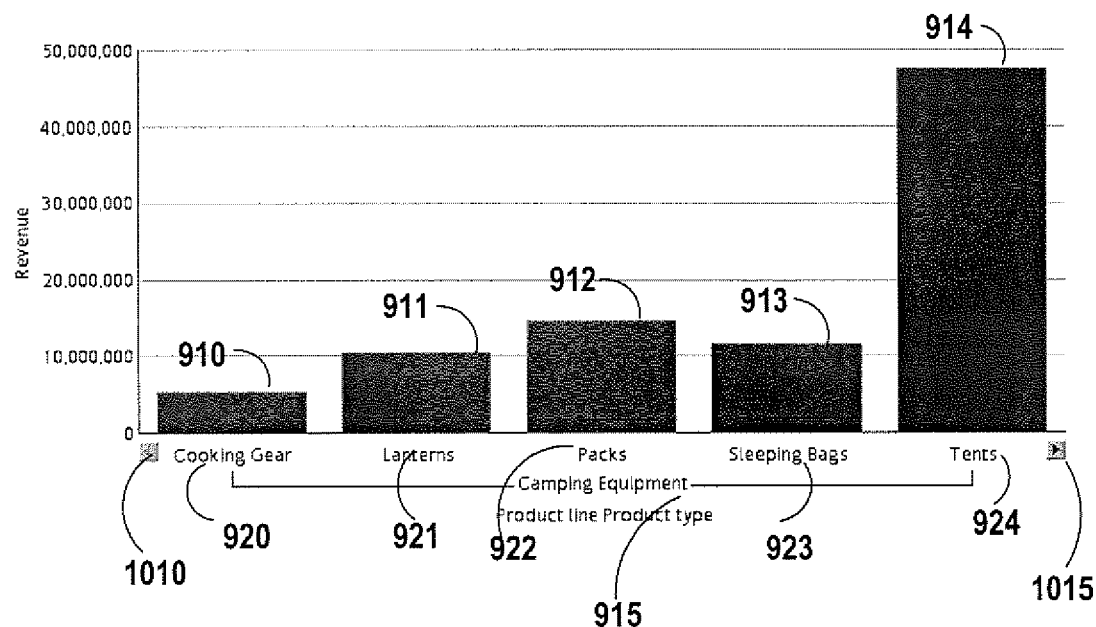
FIG. 10 shows a screen shot of a column chart according to an embodiment of the invention, with the addition of scrolling controls.

A further screenshot in FIG. 10 shows the scrolling or panning buttons at edges of the x-axis; examples of edge-tools. In this situation, the left scrolling button 1010 is disabled (dimmed), indicating that previous sub-chart does not exist, and the right scrolling button 1015 is enabled, indicating that next sub-chart exists. In this case, clicking on the left scrolling button has no effect, as expected. Clicking on the right scrolling button shows the next sub-chart (in this case the product types within a product line Golf Equipment). Other embodiments omit disabled scrolling buttons rather than show them dimmed.

In this embodiment the product lines are arranged alphabetically to ease navigation. Other embodiments may use different arrangements of the product lines; they may include columns such as total revenue, or net profit.

The examples given can be combined to produce various effects, and to provide the user with a logical, rational, legible, and useful display method and system for reporting the results of business operations.

In some preferred embodiments, reports are produced as part of a business intelligence reporting process that uses report templates, defined by report authors, to allow users to more easily derive one or more reports. Each such report includes views (sub-charts) of data of interest to the user and to others for whom the reports are intended.

Figure 11:
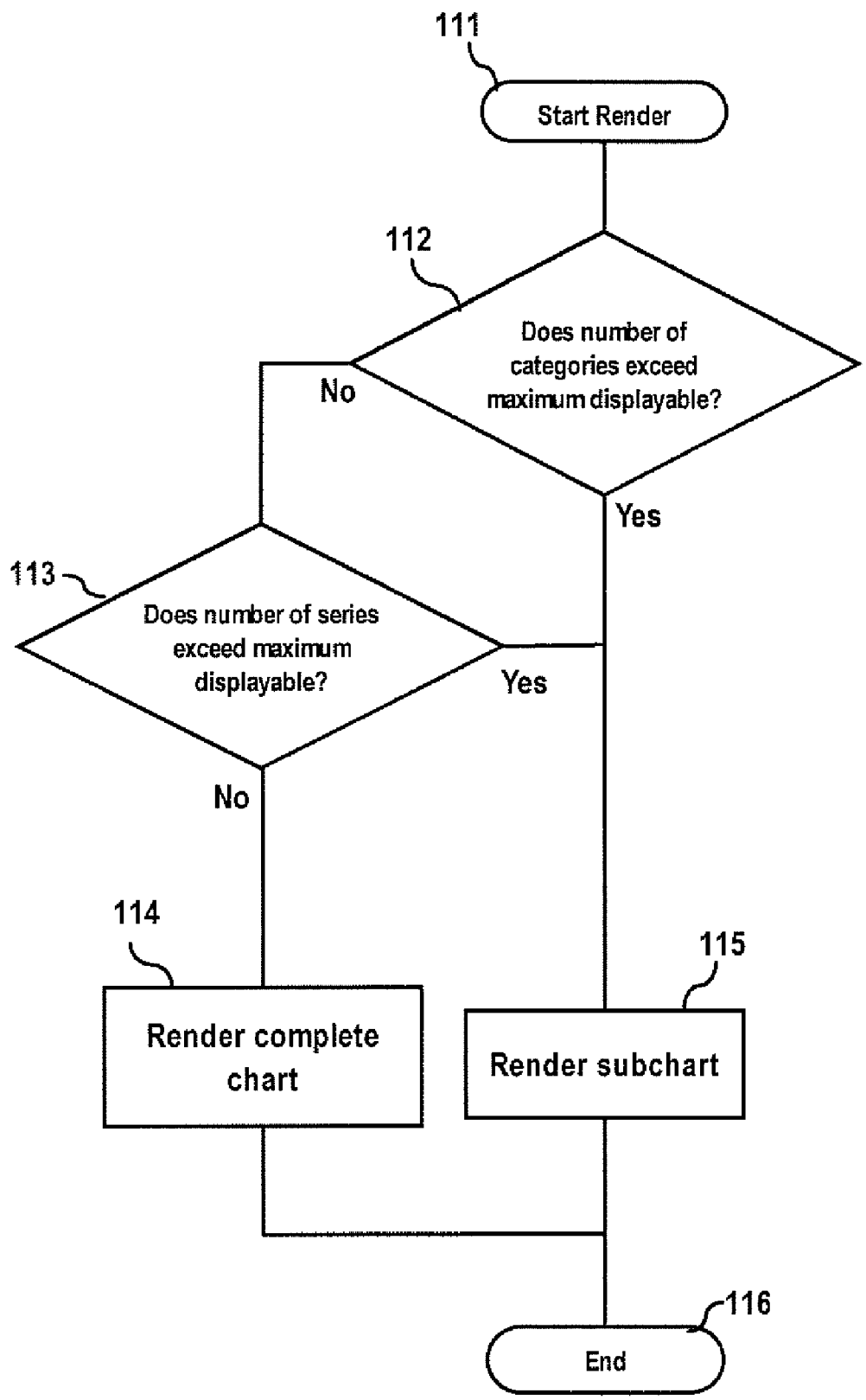
FIG. 11 shows the flow chart in which the rendering engine determines whether to display the complete chart.

FIG. 11 illustrates part of a preferred embodiment of the invention in which the rendering engine determines whether to display the complete chart, or a sub-chart. In a first step 112, the number of categories is compared to the maximum that may be displayed while still maintaining the displayed data within limits of legibility. If this limit is exceeded, then a subchart must be rendered 115. If the number of categories does not exceed the limit, then in the next step 113 number of series is compared to the maximum that may be displayed while still maintaining the displayed data within limits of legibility. If this limit is exceeded, then a subchart must be rendered 115. If the number of series does not exceed the limit, then the complete chart must be rendered 114. In all cases, when the rendering is complete, the process ends 116.

Figure 12:
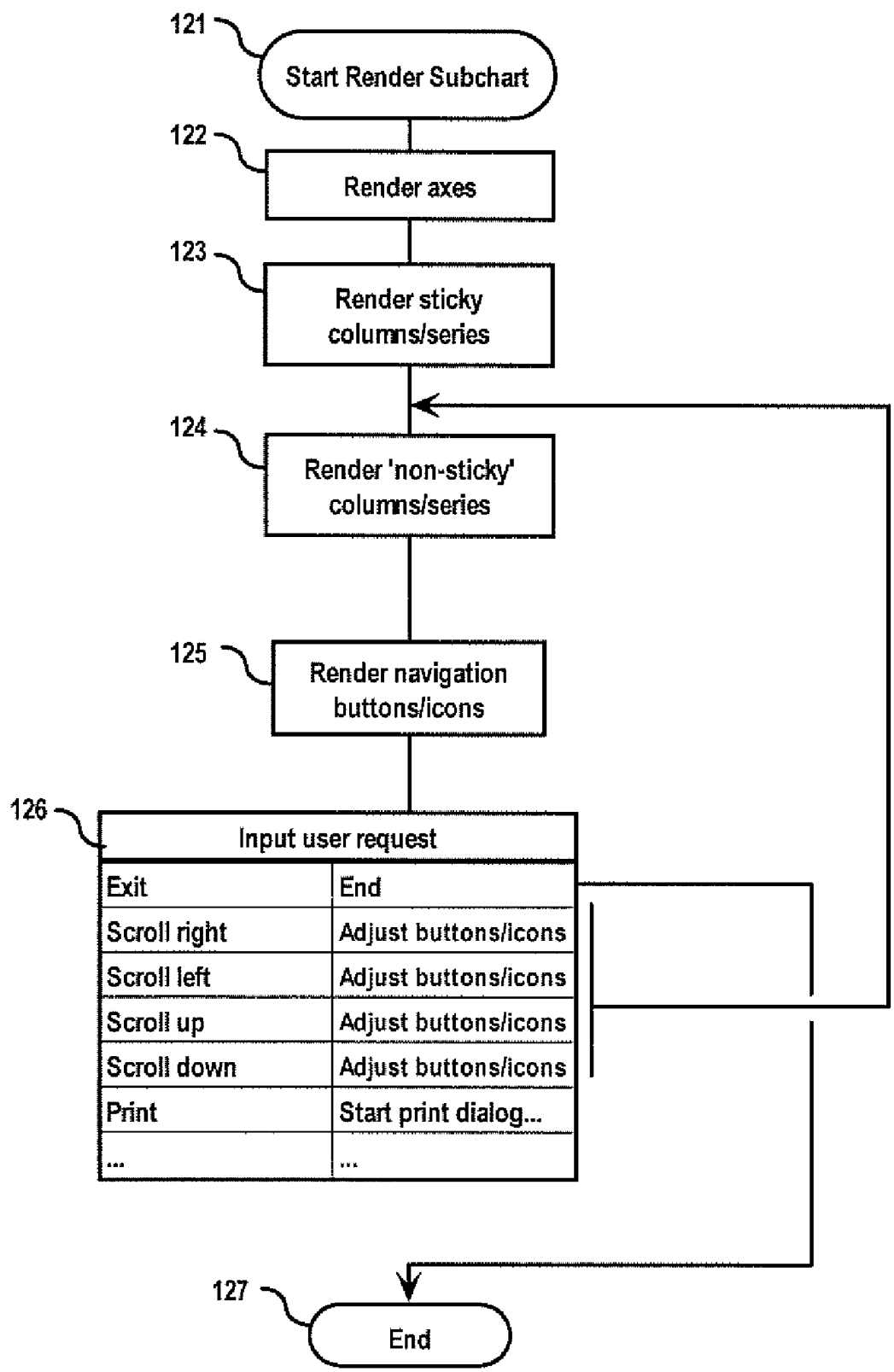
FIG. 12 illustrates a flow chart when dealing with user interaction.

FIG. 12 illustrates part of a preferred embodiment of the invention for dealing with user interaction when a sub-chart must be rendered, as for example at FIG. 11, step 115. The process starts 121, and the axes are rendered 122. Next the columns and series previously determined to be displayed on all sub-charts (sometimes called sticky columns/series—see FIG. 9, 940, 944) are rendered 123. The first group of columns/series (non-sticky) are rendered 124 within previous limitations. The appropriate navigation buttons and icons are rendered 125. The user, having determined their next choice, may decide to move to other data in the same report, and can do so by scrolling or panning as appropriate. This input is collected 126, and the appropriate adjustments made to the rendered display by repeating the steps 124, 125 as before. In some embodiments, the user may select Exit and the sub-chart rendering process ends 127.

Figure 13:
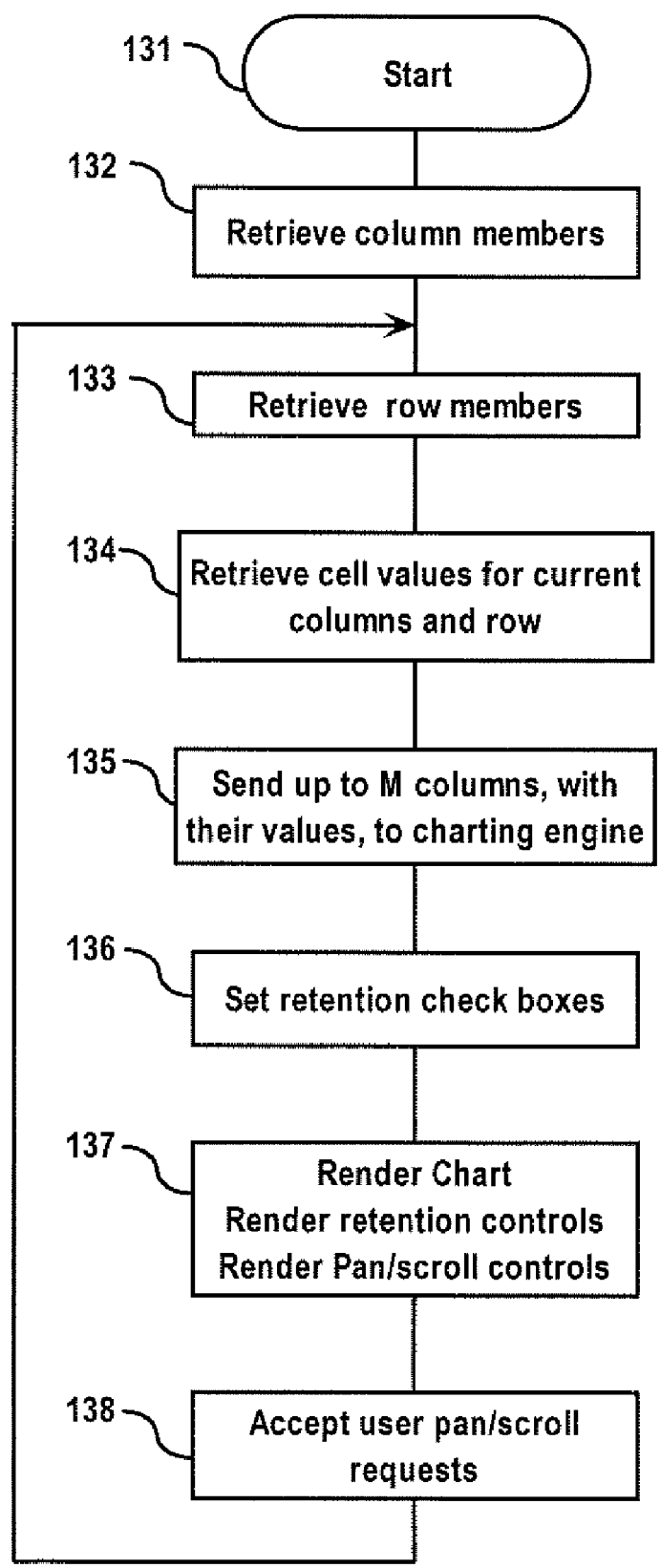
FIG. 13 is a flowchart for rendering data from a crosstab as a dynamic series of sub-charts.

FIG. 13 illustrates the general approach used in embodiments of the inventions to render data from a crosstab as a dynamic series of sub-charts. The process starts 131, and column members are retrieved from the crosstab 132, and a first set of row members is also retrieved 133. Next the actual measures of interest (e.g. the numerical values in the cells) are retrieved 134. The appropriate number of columns with their values are sent 135 to the charting engine. Retention check boxes are set 136 depending on requirements of the chart author and the user. The chart is rendered, complete with any required retention controls, and pan/scroll controls 137. At this point the user may choose to view different parts of the data and pan/scroll requests are accepted 138, resulting in the need to retrieve a further set of row members 133, and process continues as required.

The following example is provided to assist in explaining the invention, but is not intended to be limiting. It gives more detail of one embodiment of the invention in terms of process steps:

- The generalized design of a report, including defining 'display rules' composed to ensure the data is displayed in the most beneficial way, is determined. These display rules are particularly important where the volume of data exceeds well-understood limits or criteria related to legibility and usability; for instance, column width, line widths and separations for series and columns. The results of this determination are stored as parameters relating to the display of the data. Further, the most effective way of displaying that data within the display space is determined, and the results of this further determination are stored as further parameters relating to the display of the data. For instance, the type of chart used is stored as a result of the further determination.
- The categories, series, and measures of interest, are selected for inclusion in the displayed data. Adjustments to this selection may be made. In addition, orphaned and widowed data at margins of the sub-charts are handled appropriately by using suitable 'edge tools'.
- Optionally the stored parameters are varied interactively by the user to alter the format and quantity of data displayed.
- Data for the categories, series and measures of interest are retrieved from the database and stored in a crosstab.
- A subset of the data in the crosstab is selected, and the actual extent and volume of the data related to the design of the report and the parameters previously chosen and stored is determined. This selection is usually made by imposing a limit on the categories and/or series displayed in each sub-chart, or by defining control breaks to segregate sub-charts. For example, each product line may be shown as a separate sub-chart, and no sub-chart should display more than a certain number of categories. A preference for the category or series limit in any sub-chart may be set. The preference is considered only if the limits in the report have not been defined.
- A selected subset of the data is sent to the charting engine. The charting engine carries out windowing using the previously stored parameters, as optionally modified by the user, to ensure that the data are presented in a legible fashion.
- Sub-charts or views of the virtual chart, determined in accordance with the previously stored parameters, as optionally modified by the user, are sent for display to a user using a graphics engine.

When rendering a chart in accordance with some preferred embodiments of the invention following extra steps are carried out:

a) If the maximum allowed number of allowed categories is reached, a sub-chart with the maximum number of categories is created, subsequently a new sub-chart is created to render the remaining categories.

b) While creating categories, if the maximum number of allowed series is reached, then a new sub-chart to render the other series is created.

c) For a chart requiring sub-charts to accommodate categories exceeding the maximum allowed, appropriate scrolling controls are placed on one axis.

d) For a chart requiring sub-charts to accommodate large number of series, appropriate scrolling (or panning) controls are placed on the legend indicating that more columns exist to be displayed in a further sub-chart e) If a chart incorporates a statistical line, for example, average value of the measure being plotted, the value calculated from all sub-charts is represented by the statistical line. In other words, where the chart is divided into sub-charts, this statistical line is for the whole data set, not just the values in the currently displayed sub-chart.

f) If a sub-chart contains columns representing summaries of a cluster or group of columns and if widow/orphan control is enabled, the summary columns are included in the number of categories contained in each sub-chart so that the cluster of columns obeys the widow/orphan rules.

Embodiments of the present invention permit display of either or both of the numbers and the graphical representation of the numbers if required.

Embodiments of the invention allow the rows and columns to be interchanged by simply retrieving the results from the crosstab and redisplaying them. Thus categories can be rendered as series, and series rendered as categories without re-executing the underlying query.

Since printed charts also suffer from the same legibility and usability issues that face display or interactive charts, embodiments of the present invention may also be practiced in relation to printed charts. Pagination of charts with maximum categories or series is supported, as are pre-defined retention states. Interactive aspects of the retention states such as 'fixed' columns may be implemented during an interactive phase when the user can adjust the sub-charts prior to printing. Thus, reasonable amounts of data are provided in a multiple paged chart form in a convenient and flexible way. In addition, previewing of such hard copy versions may be supported, 'Page forward' scroll control, in accordance with one embodiment of the present invention results in a request to display the next sub-chart showing the next (up to) N elements of a given type, rather than the next arbitrary sub-chart. The present invention, in one aspect, encourages the use of overlap between sub-charts by using the retention states attribute associated with relevant elements to select and deselect those elements to be shown on all sub-charts.

The following pseudo-code is provided to facilitate a thorough understanding of embodiments of the invention. One skilled in the relevant art will recognize, however, that the rendering sub-charts can be practiced without one or more of the specific details, or with other methods, components, etc.

Render first sub-chart:

1. Execute query associated with chart.

This query is actually a crosstab query, returning row members, column members and cell values.

2. Retrieve all series (column) members

These members are shown in the legend.

3. Retrieve next 'N' category (row) members

'N' is the minimum of number of rows remaining in control break or limit of categories to be shown on each sub-chart.

If not breaking sub-chart categories on a control break, then 'N' is limit of categories to be shown on each sub-chart.

If not limiting categories to be shown on each sub-chart, then 'N' is all remaining rows in result set.

4. Retrieve cell values for above categories and series

Arrange cell values in a grid of 'N' categories and all series.

5. Send first 'M' columns of grid (and their cell values) to charting engine

'M' is the minimum of number of columns remaining in control break or limit of series to be shown on each sub-chart.

If not breaking sub-chart series on a control break, then 'M' is limit of series to be shown on each sub-chart.

If not limiting series to be shown on each sub-chart, then 'M' is all remaining columns in grid.

6. Set default retention check-boxes for rendered categories and series

If breaking sub-chart categories or series on a control break, then set retention on any summary (total) members for control break Otherwise, reset retention.

7. Set authored retention check-boxes for rendered categories and series

If report specification specifies setting for retention control for specific category or series, set retention appropriately.

8. Set user retention check-boxes for rendered categories and series

If user has specified setting for retention control for specific category or series, set retention appropriately.

9. Render chart

10. Render retention controls

11. Render pan and scroll controls

If categories in result set before current sub-chart, enable Page Up and Top controls; otherwise, disable them.

If categories in result set after current sub-chart, enable Page Down and Bottom controls; otherwise, disable them.

If series in grid before current sub-chart, enable Pan Left and First controls; otherwise, disable them.

If series in grid after current sub-chart, enable Pan Right and Last controls; otherwise, disable them.

User will select one of the pan or scroll controls, at which point the next sub-chart will be rendered:

a) If Page Down selected:

'N' is the next rows in result set after current sub-chart.

'N' is the minimum of number of rows remaining in control break or limit of categories to be shown on each sub-chart (see 3 above).

'N' will be reduced by any retention controls that have been enabled on previous rows. Retention controls on subsequent rows are ignored (for now).

count of retention controls enabled must be less than 'N'; otherwise, only first N−1 enabled retention controls are recognized.

b) If Page Up selected:

'N' is the previous rows in result set before current sub-chart

'N' is the minimum of number of rows remaining in control break or limit of categories to be shown on each sub-chart (see 3 above).

'N' will be reduced by any retention controls that have been enabled on previous rows. Retention controls on subsequent rows are ignored (for now).

count of retention controls enabled must be less than 'N'; otherwise, only first N−1 enabled retention controls are recognized.

c) If Pan Right selected.

'M' is the next columns in grid after current sub-chart

'M' is the minimum of number of columns remaining in control break or limit of series to be shown on each sub-chart (see 5 above).

'M' will be reduced by any retention controls that have been enabled on previous columns. Retention controls on subsequent columns are ignored (for now).

count of retention controls enabled must be less than 'M'; otherwise, only first M−1 enabled retention controls are recognized.

d) If Pan Left selected:

'M' is the previous columns in grid before current sub-chart

'M' is the minimum of number of columns remaining in control break or limit of series to be shown on each sub-chart (see 5 above).

'M' will be reduced by any retention controls that have been enabled on previous columns. Retention controls on subsequent columns are ignored (for now).

count of retention controls enabled must be less than 'M'; otherwise, only first M−1 enabled retention controls are recognized.

e) If Top selected:

'N' is the first 'N' rows in result set

'N' is the minimum of number of rows remaining in control break or limit of categories to be shown on each sub-chart (see 3 above).

'N' will be reduced by any retention controls that have been enabled on previous rows. Retention controls on subsequent rows are ignored (for now).

count of retention controls enabled must be less than 'N'; otherwise, only first N−1 enabled retention controls are recognized.

f) If Bottom selected:

'N' is the last 'N' rows in result set

'N' is the minimum of number of rows remaining in control break or limit of categories to be shown on each sub-chart (see 3 above).

'N' will be reduced by any retention controls that have been enabled on previous rows. Retention controls on subsequent rows are ignored (for now).

count of retention controls enabled must be less than 'N'; otherwise, only first N−1 enabled retention controls are recognized.

g) If First selected:

'M is the first 'M' columns in grid.

'M' is the minimum of number of columns remaining in control break or limit of series to be shown on each sub-chart (see 5 above).

'M' will be reduced by any retention controls that have been enabled on previous columns. Retention controls on subsequent columns are ignored (for now).

count of retention controls enabled must be less than 'M'; otherwise, only first M−1 enabled retention controls are recognized.

h) If Last selected:
'M is the last 'M' columns in grid.
'M' is the minimum of number of columns remaining in control break or limit of series to be shown on each sub-chart (see 5 above).
'M' will be reduced by any retention controls that have been enabled on previous columns. Retention controls on subsequent columns are ignored (for now).
count of retention controls enabled must be less than 'M'; otherwise, only first M−1 enabled retention controls are recognized.

12. Go to step 3. (above).

Embodiments of the invention can be implemented in digital electronic circuitry or in computer hardware, firmware, and software or in combinations thereof. Apparatus of the present invention can be implemented in a computer program product tangibly embodied in a machine-readable storage device for execution by a programmable processor. The method of the present invention can be performed by a programmable processor executing a program of instructions to perform the functions of the invention by operating on input data and generating output.

Many alterations and modifications may be made by those having ordinary skill in the art without departing from the spirit and scope of the invention. Therefore, it must be understood that the illustrated embodiments have been set forth only for the purposes of example, and that it should not be taken as limiting the invention as defined by the following claims. The following claims are, therefore, to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention

What is claimed is:

1. A method for graphical display of selected data from a data source for use in a business intelligence reporting system, the method comprising:
   determining interactively with a user a generalized design of a report for subsequent displaying of the selected data in sub-charts;
   selecting series, categories and measures of interest for inclusion in a report, and storing the series, the categories and the measures of interest in a collection of display rules;
   extracting a first set of data pertaining to the series, the categories and the measures of interest from the data source;
   storing the first set of data in a crosstab;
   selecting a subset of the first set of data in the crosstab;
   creating a virtual chart containing the selected subset of the data;
   creating a sub-chart of the virtual chart according to the stored collection of display rules; and
   displaying the sub-chart of the virtual chart using the stored collection of display rules, wherein the sub-chart is limited to displaying less than all the categories included in the virtual chart at any given time, and wherein the sub-chart includes navigation keys that allow the user to navigate through all the categories included in the virtual chart, and wherein the sub-chart includes retention boxes that allow a user to designate specific categories to remain displayed in fixed positions on the sub-chart when the user navigates through all the other categories included in the virtual chart using the navigation keys, wherein the navigating includes shifting the categories on the sub-chart.

2. The method of claim 1 wherein the determining step further comprises the steps of:
   setting display rules; and
   storing the display rules as a collection of display rules.

3. The method of claim 2 wherein the setting display rules step further comprises:
   setting a legibility of the sub-chart defined by a minimum size of each element of the sub-chart; and
   setting a usability of the sub-chart based on the series, the categories and the measures of interest wherein panning and scrolling through the selected data is permitted.

4. The method of claim 3 further comprising:
   enabling widow/orphan control for adjusting the number of categories contained in each sub-chart to meet widow/orphan rules.

5. The method of claim 2, further comprising:
   receiving input to adjust the display rules; and
   storing the adjusted display rules in the collection of display rules.

6. The method of claim 1, further comprising:
   receiving input to request viewing of further data in the report.

7. The method of claim 1, further comprising:
   receiving input having additional series, categories or measures of interest for inclusion in a further instance of the report.

8. The method of claim 1, further comprising:
   receiving user input generated by selection of the navigation keys; and
   re-displaying the sub-chart to take account of the user input.

9. The method of claim 1, further comprising:
   defining one or more statistical elements for inclusion in the report, the statistical elements being based on the data in the virtual chart; and
   including the one or more statistical elements on each sub-chart.

10. A system, comprising:
    a computer processor;
    a memory containing a program, which when executed on the computer processor, is configured to display selected data from a data source for use in a business intelligence reporting system by performing the steps of:
       determining interactively a generalized design of a report to ensure the selected data being subsequently displayed in sub-charts;
       selecting series, categories and measures of interest for inclusion in instances of a report, and storing the series, the categories and the measures of interest in a collection of display rules for subsequent use;
       extracting a first set of data pertaining to the series, the categories and the measures of interest from the data source;
       storing the first set of data in a crosstab;
       selecting a subset of the first set of data in the crosstab;
       creating, using the computer processor, a virtual chart containing the selected subset of the data;
       creating a sub-chart of the virtual chart according to the stored collection of display rules; and
       displaying the sub-chart of the virtual chart using the stored collection of display rules, wherein the sub-chart is limited to displaying less than all the categories included in the virtual chart at any given time, and wherein the sub-chart includes navigation keys that allow the user to navigate through all the categories included in the virtual chart, and wherein the sub-chart includes retention boxes that allow a user to designate specific categories to remain displayed in fixed positions on the sub-chart when the user navigates through all other categories included in the virtual chart using the navigation keys, wherein the navigating includes shifting the categories on the sub-chart.

11. The system of claim 10 wherein determining interactively a generalized design of a report further comprises:
setting display rules; and
storing the display rules as a collection of display rules.

12. The system of claim 11 wherein setting display rules further comprises:
setting a legibility of the sub-chart defined by a minimum size of each element of the sub-chart; and
setting a usability of the sub-chart based on the series, the categories and the measures wherein panning and scrolling through the selected data is permitted.

13. The system of claim 12 further comprising:
enabling widow/orphan control for adjusting the number of categories contained in each sub-chart to meet widow/orphan rules.

14. The system of claim 11 further comprising:
receiving input to adjust the display rules; and
storing the adjusted display rules in the collection of display rules.

15. The system of claim 10 further comprising:
receiving input to pan through the categories and view further data in the report.

16. The system of claim 10 further comprising:
receiving input having additional series, categories or measures of interest for inclusion in a further instance of the report.

17. The system of claim 10, further comprising:
receiving user input generated by selection of the navigation keys; and
re-displaying the sub-chart to take account of the user input.

18. The system of claim 10, further comprising:
defining one or more statistical elements for inclusion in the report, the statistical elements being based on the data in the virtual chart; and
including the one or more statistical elements on each sub-chart.

19. A computer-readable storage medium containing a program which, when executed, performs an operation for graphical display of selected data from a data source for use in a business intelligence reporting system, comprising:
determining interactively a generalized design of a report to ensure the selected data being subsequently displayed in sub-charts;
selecting series, categories and measures of interest for inclusion in instances of a report, and storing the series, the categories and the measures of interest in a collection of display rules for subsequent use;
extracting a first set of data pertaining to the series, the categories and the measures of interest from the data source;
storing the first set of data in a crosstab;
selecting a subset of the first set of data in the crosstab;
creating a virtual chart containing the selected subset of the data;
creating a sub-chart of the virtual chart according to the stored collection of display rules; and
displaying the sub-chart of the virtual chart using the stored collection of display rules, wherein the sub-chart is limited to displaying less than all the categories included in the virtual chart at any given time, and wherein the sub-chart includes navigation keys that allow the user to navigate through all the categories included in the virtual chart, and wherein the sub-chart includes retention boxes that allow a user to designate specific categories to remain displayed in fixed positions on the sub-chart when the user navigates through all other categories included in the virtual chart using the navigation keys, wherein the navigating includes shifting the categories on the sub-chart.

* * * * *